United States Patent [19]

Cianciolo et al.

[11] 3,936,158
[45] Feb. 3, 1976

[54] REMOTE CONTROL REAR VIEW MIRROR OPERATING MECHANISM

[75] Inventors: Joseph Cianciolo; Robert E. McGargal, both of Grand Rapids, Mich.

[73] Assignee: Rem Die Casting, Inc., Grand Rapids, Mich.

[22] Filed: Dec. 30, 1974

[21] Appl. No.: 537,534

Related U.S. Application Data

[63] Continuation of Ser. No. 418,473, Nov. 23, 1973, abandoned.

[52] U.S. Cl. ............................. 350/289; 74/501 M
[51] Int. Cl.² ......................................... G02B 5/08
[58] Field of Search ........... 350/289, 303, 304, 307; 74/501 M

[56] References Cited
UNITED STATES PATENTS
3,751,141   8/1973   Brown ............................... 350/289

*Primary Examiner*—Alfred E. Smith
*Assistant Examiner*—Jon W. Henry
*Attorney, Agent, or Firm*—Dale Austin Winnie

[57] ABSTRACT

An operative mechanism for use in combination with a rear view mirror assembly and which comprises: sealing housing parts forming an enclosure for component parts that are preassembled and include, a small reversible electric motor, screw threaded shaft and travel nut arrangement, together with a follower arm and pivot pin assembly received in operative engagement with each other within receptive and functional housing walls to provide a small, compact device for pivotal control and viewing adjustment of the rear view mirror.

1 Claim, 7 Drawing Figures

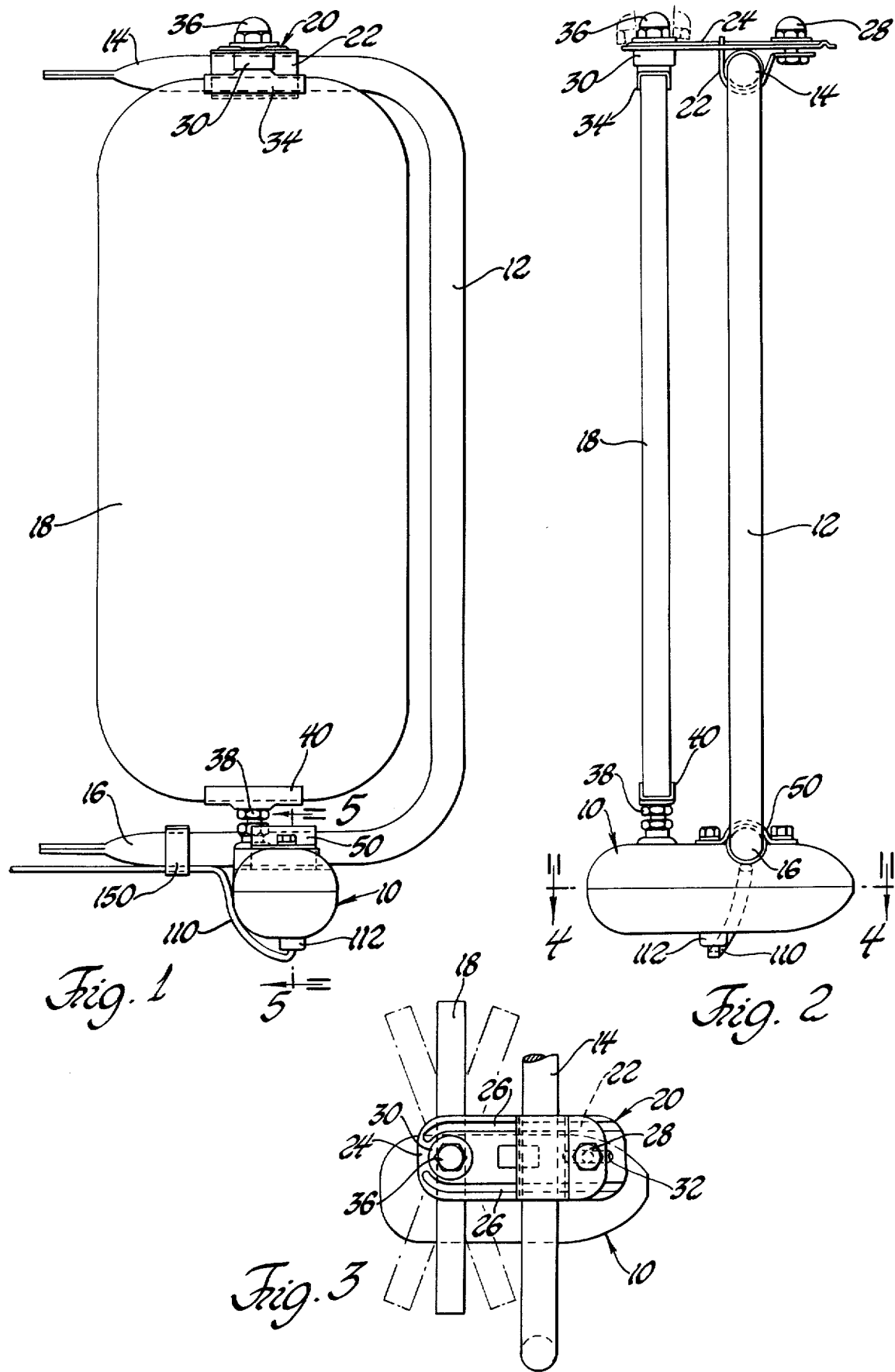

REMOTE CONTROL REAR VIEW MIRROR OPERATING MECHANISM

This is a continuation of application Ser. No. 418,473, filed Nov. 23, 1973, now abandoned.

BACKGROUND OF THE INVENTION

Vehicle trucks and cars for pulling trailers commonly use what is known as a west-coast type rear view mirror assembly which includes an elongated mirror that is mounted on extended arms to stand out and away from the vehicle body. These mirrors are of such length that they usually do not require adjustment of the vertical viewing angle, once they are set, but different trailers lengths, different drivers, and different driver positions do make it desirable to be able to adjust their side viewing angle.

Although remote control rear view mirror operators are known for other uses, they are not adaptable for use with this type of mirror.

Since this type of truck mirror stands out some distance from the vehicle, and is of an appreciable size, it is very subject to wind deflections when the vehicle truck or car is traveling at any appreciable speed. Accordingly, it must be relatively fixed and held in any given readjusted position and this normally requires manual adjustment, outside the vehicle and when the vehicle is at rest.

Cable control operators require a certain freedom of movement as regards the mirror which precludes their use unless the mirror is within a protective wind shroud. Other types of actuators are impractical for like reasons of stiffness required in the mirror mounts and because of the removed location of the mirror so far out and away from the vehicle body. Even electrical control devices have been unsatisfactory because of gear train play and the size of the unit required to be hung on the mirror assembly.

The cost of a remote control rear view operator for truck mirrors is also a very important consideration. These mirrors are frequently damaged, since they stand out so far from the vehicles on which mounted, and any control device that is mounted on them must be relatively inexpensive to produce and to install. It must also be relatively small and compact in size, since it will also afford a certain amount of wind resistance, and can otherwise contribute to wind deflection and other problems.

Although various types of remote control operating mechanisms are known for use with rear view mirrors, a really acceptable remotely controlled operator for truck mirrors requires a unique combination of engineering and manufacturing talents to produce the relatively inexpensive and highly serviceable end product that is needed.

SUMMARY OF THE PRESENT INVENTION

The present invention is directed to a remote control operating mechanism for the west-coast type truck mirror which includes a small reversible electric motor and gear train unit, in combination, that drives a lead-screw and travel nut sub-assembly which in turn causes a side angle viewing adjustment of a rear view mirror through a follower arm on a pivot pin mount for the mirror.

The housing for the operating mechanism is aerodynamic, an elongated egg shape, formed in two parts which cooperate to provide structural strength, with light weight thin walls, and is mounted transversely on the mirror supporting structure to serve either right or left hand mirror assemblies equally as well.

The motor and gear train unit, for speed reduction and power amplification, are pre-assembled on a mounting plate and in driving engagement with the lead-screw and travel nut assembly, so that both can be dropped together and fixedly located in one of the housing parts. The pivot pin and follower arm are similarly dropped into place, with a slight float allowed for the pin to transmit a modest bending force to the travel nut, which is split to eliminate thread play as regards the ball screw.

The electrical connection is made through an override switch beneath the travel nut, on the lead-screw, which precludes in either direction which would cause internal damage, and the whole unit is sealed by heat staking the two housing parts together.

The housing parts are castings with only functional walls and derive structural strength from their shape in combination. Accordingly, there is an appreciable savings in material and weight. Very few component parts are used, they are readily pre-assembled and they are fitted and retained within the housing parts without separate fastener means. The whole assembly is small, compact, light in weight and readily mounted to serve its intended purpose.

DESCRIPTION OF THE DRAWING FIGURES

FIG. 1 is a back side view of a mirror assembly including the present invention.

FIG. 2 is an outer side-edge view of the same mirror assembly with the remote control operative mechanism of the present invention shown in use therewith.

FIG. 3 is a top plan view of the mirror support and operating mechansigm with the mirror member shown in phantom in different side angle viewing positions.

DESCRIPTION OF THE ILLUSTRATED EMBODIMENT

Figure 4:
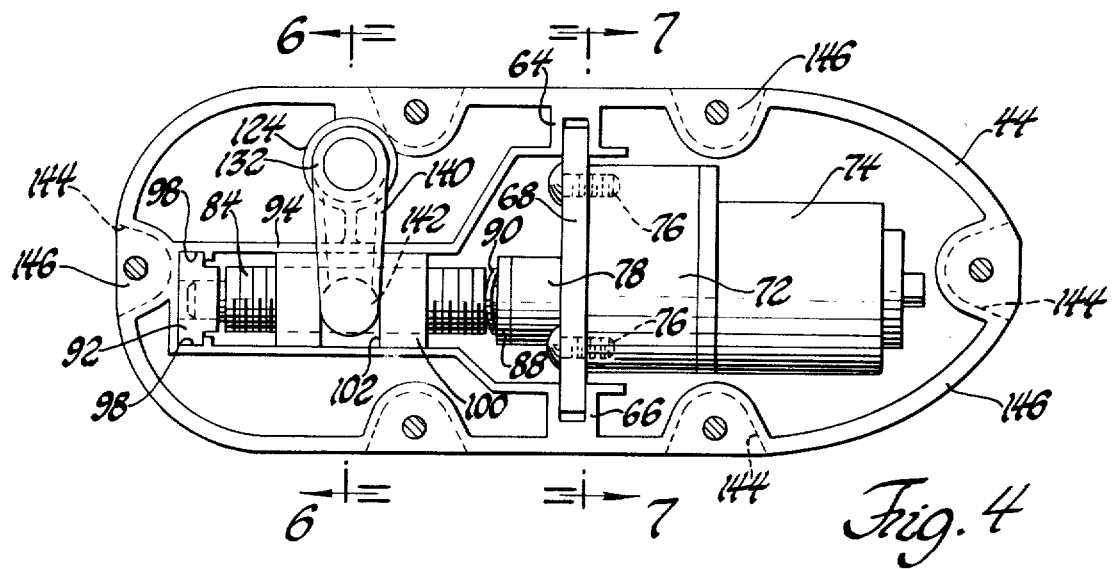
FIG. 4 is a top plan view of the operating mechanism of the present invention as seen in the lower housing part, with the cover part removed, as in the plane of line 4—4 in the second drawing figure.

The mirror control device 10 of the present invention is shown in the first three drawing figures as used with what is commonly known as a "west-coast" type rear view mirror assembly.

Such mirror assemblies include mounting brackets which are fastened to a vehicle truck or car door, above and below the door window, to extend outwardly away from the side of the vehicle and which have a mirror supporting member 12, such as is shown, engaged thereto as by the inwardly turned arms 14 and 16. This disposes the elongated mirror 18 sufficiently out and away from the vehicle to afford a better view rearwardly along the length of a trailer or whatever that is being pulled by the vehicle assembly.

The mirror member 18 is usually mounted on the mirror supporting member 12 for independent viewing adjustment about a vertical axis, or else it is fixed to the supporting member which is in turn relatively adjustable with respect to the mounting brackets for side angle viewing adjustment. And, in almost every instance, such adjustments must be made manually.

In the present instance, the mirror control device 10 is fastened to the lower arm 16 of the supporting member 12, normal or transversely thereof, and a bracket 20 is fastened to the upper arm 14 of the mirror supporting member, in a like transverse disposition, to receive and support the mirror member 18 between them and in relatively parallel spaced relation for independent pivotal actuation apart from the supporting arm or member structure 12.

Although the vertical length of the mirror member 18 normally precludes the need for adjusting the vertical viewing angle of the mirror, in use, some means of setting the mirror during installation is required. And, in the present instance, this is provided within the supporting bracket 20.

A clamp arm 22, formed to engage the underside of the upper mirror supporting member arm 14, and a plate or stampling member 24, with strengthening ribs 26, comprise the bracket 20 and are engaged together by a bolt and nut fastener 28. The extended end of the member 24 includes a pivotal support 30 for the mirror member and an elongated slot 32 in its other end, through which the fastener 28 extends, enables sufficient force for and aft movement to tilt the mirror for setting the vertical viewing angle, as and when required and as indicated by the phantom views of the pivotal support 30 for the mirror shown at the top of FIG. 2.

A U-shaped bracket member 34, which is part of the mirror and case member 18, includes a pivot pin post (not shown) which receives a nut 36 on its end, as extended through a receptive hole in the supporting bracket 20, to hold it in place.

Similarly, the bottom edge of the mirror and case member 18 includes a like bracket member 40 and pivot pin post, which serves as the lower pivotal support 38, and it is threaded so that it can be engaged within a receptive fitting (later described) within the mirror control device 10.

Referring now to FIGS. 4–7, the mirror control device of the present invention is shown to include the upper and lower housing parts 42 and 44 within which certain operating mechanism is provided. Together they form an extended egg-shaped or streamlined enclosure with the upper half or part 42 including the means of fastening the mirror control device to the underside of the supporting arm 16.

The upper or cover half 42 of the housing parts is formed to include a depression 46 transversely thereacross, near one end. It is of a relative size to receive the lower half of the supporting arm 16, with an open clamping ring 48 around it, therewithin and it has a clamping member 50 extended thereover and retained by fasteners 52 threaded into bolt hole posts 54 on each side. This fixes and holds the whole mirror control device 10 in its fore and aft relationship on the supporting member 10, disposed for low wind resistance (which can cause mirror flutter) and with its other end positioned to receive and support the lower end of the mirror member 18, as shown in FIG. 2.

The cover housing part 42 is of a relatively thin walled die cast construction without reinforcing cross-ribs or the like, made possible by its shape and the added strength obtained in its combination with the lower housing part 44. It includes areas of greater wall thickness 56 at its ends and at side wall locations which also include short studs 58 that are received in receptive holes in other housing member and are later heat staked to seal the two together. There is also an opening 60 provided through the top wall of the cover part that receives a sealing member 62 through which part of the mirror operating mechanism extends, as will be described later.

Figure 7:
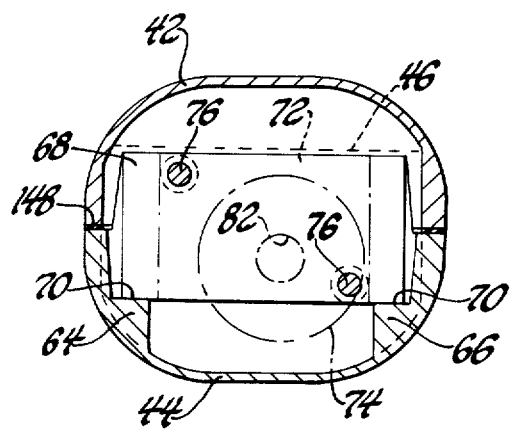
FIG. 7 is a cross-sectional view showing the motor and gear train mounting plate as seen in the plane of line 7-7 also in the fourth drawing figure.

The main body housing 44 is of a like relatively thin walled die cast construction. And, intermediate its ends, it is formed to include respectively aligned wall sections 64 and 68. The slots terminate in a shoulder 70, at both sides, which fix and limit the depth to which the mounting plate is set, as shown in FIG. 7, and they are of a width which will provide a reasonably close fit with the mounting plate to ensure its vertical disposition.

A small gear box 72 and reversible electric motor 74, in combination, are fastened to the back side of the mounting plate 68, as by screw fasteners 76. Since the mounting plate is retained in a vertical disposition, the gear box and motor stand out behind it relatively spaced from the housing side walls and without requiring further support.

Figure 5:
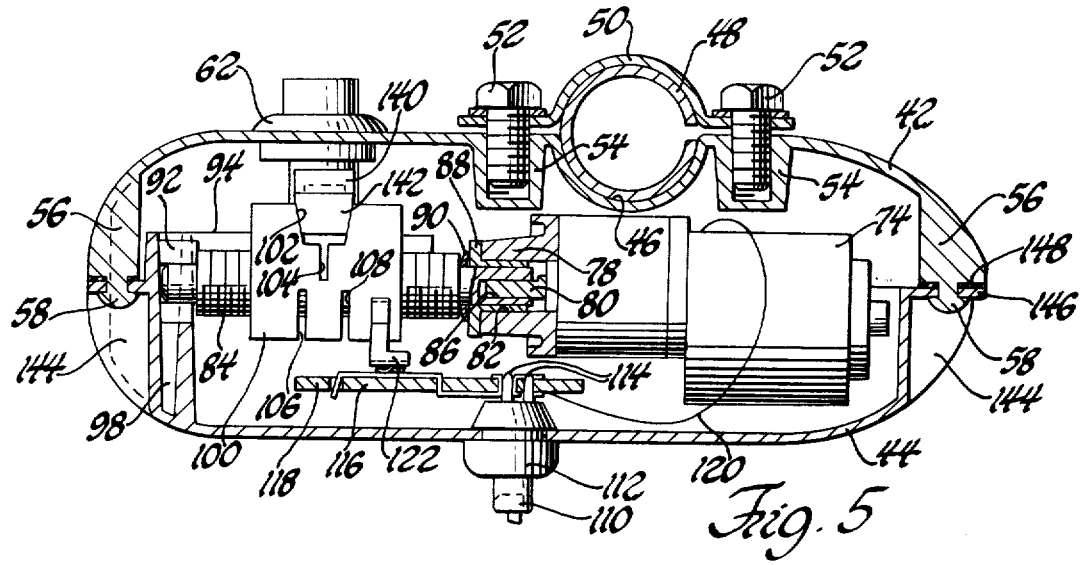
FIG. 5 is a partially cross-sectioned view as seen in the plane of line 5—5 of the first drawing figure, showing the operating mechanism of the present invention within the sealed housing parts.

The depression 46 formed in the housing cover part 42, for fastening the whole assembly to the mirror member supporting arm 16, will be appreciated as lying closely over the small gear box 72. This is best shown in FIG. 5 and in dotted outline in FIG. 7, and in part serves to assure that the drive assembly and mounting plate are properly disposed in the lower housing part 44 before the cover part can be fastened and sealed to it.

Referring now to the front side of the mounting plate 68, it will be seen that a protruding collar 78 is formed on it in line with the drive key 80 from the gear box 72 that an opening 82 through the mounting plate and collar is provided for the drive connection with a lead-screw 84.

The end of the lead-screw 84 which is received in the mounting plate collar 78 is slotted as at 86 for driving engagement with the drive key from the gear box and it includes a thrust bushing 88 and a spring washer 90.

The other end of the lead-screw 84 is journalled in a thrust bushing 92 that is received and retained in a particular manner as the far end of the lower housing part 44. This includes closely spaced guide walls 94 and 96 which extend in parallel spaced relation along both sides of the lead-screw and which are formed at their far end to include slots 98 that receive and hold the headed end of the thrust bushing fixed therewithin.

The guide walls 94 and 96 are cast to merge with the slotted wall sections 64 and 66, for added structural strength, and they are spaced apart sufficiently to receive and guide a travel nut 100 threaded on the lead-screw 84.

The travel nut 100 includes straight side walls that guide on the guide walls 94 and 96 and cause it to travel back and forth on the lead-screw, without turning, in accord with the direction of drive imposed by the small reversible drive motor 74, through the speed reduction gear box 72.

An inwardly tapering slot 102 is formed across the top of the travel nut 100 and it is provided with relief slots or cuts 104, on top, and 106 and 108, across its bottom. The latter serve to allow relative spreading of the nut on top and contraction underneath to eliminate play and back lash problems as regards the lead-screw drive connection between the nut and the lead-screw member 84.

In furtherance of this same objective, it will be appreciated that the spring washer 90 acts through the thrust bushing 88 against the mounting plate collar to eliminate longitudinal play in the lead-screw itself.

Electric power and control for the reversible drive motor 74 is provided by a cable connection 110 to a connector plug and seal 112, fitted into an opening in the bottom wall of the lower housing part 44. The prongs 114 of the plug engage conductor strips 116 on a safety switch plate 118 under the travel nut 100 and they are in turn connected to the drive motor, as schematically illustrated by the line 120. Power is applied to drive the motor, and in turn the lead-screw, in one direction or the other, and the travel nut is provided with a foot piece 122 that rides on the conductor strips and includes contact points engaging different conductor strips to serve as a safety switch and cut off the power to the motor when the travel nut reaches the end of its travel in either direction.

The advantages of this safety switch arrangement are obvious.

Figure 6:
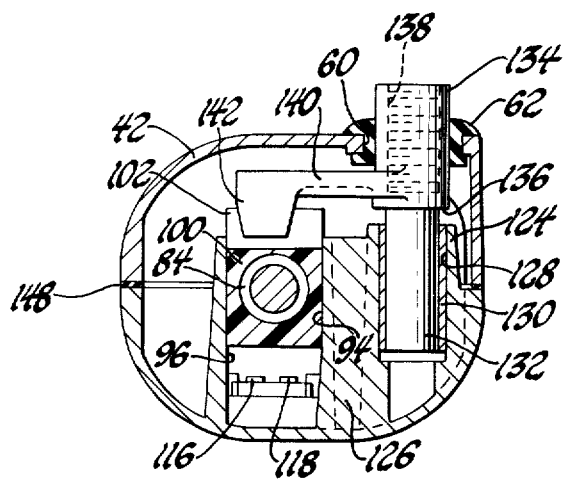
FIG. 6 is a cross-sectional view of the remote control device of the present invention as seen in the plane of line 6—6 in the fourth drawing figure.

Turning now to FIG. 6, and the means by which the travel nut is operative of the rear window mirror member 18:

A post 124 is formed within the lower housing part 44 against the side wall and behind the guide wall 94, with a connecting web 126 to it. Within the post is provided a hole 128, vertically disposed, and with a bushing 130 in it receptive of a pivot pin member 132. The upper end 134 of the pivot pin member is oversized, with respect to the lower end, providing a shoulder 136 therebetween, and it is internally threaded as indicated at 138 to receive the pivot pin post of the lower pivotal support member 38, on the bottom edge of the rear view mirror member 18.

Additionally, the pivot pin member is provided with a follower arm 140 that extends out over the travel nut 100 and includes an end 142 tappered to fit the tappered slot 102 across the nut and to ride therein, slightly back and forth, as the nut moves on the lead-screw. As a consequence, the longitudinal travel of the nut causes rotary movement of the pivot pin and pivotal movement of the mirror member in threaded and lock nut held engagement therewith.

It will also be noted that a modest amount of float is allowed the pivot pin 132 so that the weight of the mirror member on it is transmitted through the follower arm 140 to impose the necessary bending force on the split nut 100.

From the foregoing, it will be appreciated that the mounting plate 68, gear box 72 and motor 74 and on preassembled unit, the lead-screw 84 and travel nut 100 another, which are assembled together and dropped into the lower housing part, and that the pivotal pin member 132 is similarly dropped into place, in engagement with the travel nut slot, and that the housing parts are then ready to be closed and sealed together.

The lower housing part 44 is formed with end and side wall depressions 144, with an over flange which provides pads 146 through which holes are provided for the cover housing studs 58, and that are heat staked in securing the two housing parts together, with a sealing gasket 148 therebetween.

The final assembly is neat and compact and is readily fastened on the mirror member supporing arm 16, by means of the clamping member 50, with the cable connection 110 fastened to the support and mounting arms as by cable clamps 150, and with the remote control switch (not shown) for operating the drive motor disposed in the vehicle cab or drivers compartment.

The transverse disposition of the mirror control device 10 serves both to place it in a more aerodynamic and asthetically attractive position and, as will be appreciated, it also enables the same control device to serve equally as well for right and left hand outside mirrors on a vehicle truck or car.

We claim:

1. An electrical drive and switching arrangement for reversible electric motors operative of rear view mirrors for vehicles and providing for remote control actuation thereof, said arrangement including a housing structure for a small reversible electric motor, a threaded shaft driven by the motor and having a travel nut thereon, a mirror member and a mirror drive connection with follower operatively engaged with the travel nut, all of which provides an operating mechanism for a remote control rear view mirror, said housing structure comprising a complimentary housing member parts of relatively thin walled construction and like contour in cross-section for receiving said motor and shaft longitudinally therebetween and having them closely fitted therewithin, said housing member parts having their opposite and respective ends curved and contoured to also more closely encase the ends of said motor shaft and to provide structural strength in combination and to the exclusion of non-functional internal walls and ribs, a motor mounting wall member respective within and between said housing parts and having the reversible electric motor pre-assembled thereto and extended on one side thereof and with the threaded shaft driven by the motor extended therethrough and on the other side thereof, receptive means formed within said housing member parts and grooved to receive and retain said mounting wall member in precise location therebetween and in cross-sectional strengthening relation transversely across said housing member parts as received and entrapped therewithin, parallel spaced guide walls provided longitudinally within one of said housing member parts from said mounting wall receptive means towards the end of said one housing part for retaining the threaded shaft and its travel nut therebetween and providing added structural strength to said housing part, bearing receptive means provided between the ends of said guide walls and bearing means receptive in said means and of the end of said threaded shaft for supporting said threaded shaft and its travel nut relatively spaced from the bottom wall of said one housing part, means received through the other of said housing member parts and including said mirror drive connection and said follower for travel nut engagement, and means sealing housing member parts together and retaining said operating mechanism in assembly as described therebetween, electrical means received and retained between said guide walls lengthwise under the threaded shaft for operative control of said motor and for contact engagement with said travel nut to effectuate reverse drive of said motor at end travel positions upon actuation of reversible switch means, said travel nut being relieved transversely thereacross an opposite sides thereof to afford relative bending freedom longitudinally for eliminating thread play and having a downwardly tappering slot receptive of the end of said follower or like shape therewithin, and said follower supporting the weight of said mirror member and mirror drive connection to provide the close fitting of said travel nut on said threaded shaft and the contact engagement required.

* * * * *